Patented Mar. 21, 1944

2,344,934

UNITED STATES PATENT OFFICE 2,344,934

QUATERNARY NITROGEN CONDENSATION PRODUCTS OF METHYLOL UREA ETHERS

Herbert J. West, Stamford, Conn., assignor to American Cyanamid Company, New York, N. Y., a corporation of Maine No Drawing. Application February 12, 1943, Serial No. 475,671

19 Claims. (Cl. 260—295)

This invention relates to quaternary nitrogen condensation products of ethers of dimethylol urea and to their methods of preparation. The invention includes the compounds themselves, their methods of preparation, and compositions containing the new products.

Although dimethoxydimethylurea and diethoxydimethyl urea are water-soluble, the corresponding dimethylol urea ethers of alcohols containing 4 or more carbon atoms are insoluble in water and must be prepared and applied as solutions in organic solvents. It is a principal object of the present invention to provide a class of condensation products of dimethylol urea ethers of alcohols of 4 or more carbon atoms which are soluble or dispersible in water, and which can therefore be applied in the form of aqueous solutions or suspensions. A further object of the invention resides in the provision of a class of water-soluble or water-dispersible derivatives of dimethylol urea ethers of higher alcohols which will deposit insoluble and curable polymers of dimethylol urea ethers upon simple heating.

I have found that the water-insoluble ethers of dimethylol urea in their uncured or substantially monomeric condition can be reacted with salts of tertiary nitrogen bases to form a new class of quaternary condensation products having the formula

$$ROCH_2.NH.CO.NH.CH_2.N(tert)—Y \quad (1)$$

wherein R is an alcohol-forming radical containing 4 or more carbon atoms, N(tert) is the nitrogen of a tertiary nitrogen base and Y is a salt-forming anion. These new condensation products are soluble or dispersible in water and aqueous solvents, depending on the nitrogen base used in their preparation, but will decompose upon heating above 80° C. with the formation of water-insoluble resinous polymers. They are therefore valuable resin-forming materials for use in the creaseproofing and waterproofing of textile fibers such as cotton, spun rayon and other artificial fabrics as well as in resist-printing, as vehicles for textile printing pastes and as dyeing assistants. They may also be used in producing paper of improved wet strength, either by tub sizing the dried paper in their aqueous solutions or by impregnating the paper stock in the beater, stuff chest or head box followed by heating the stock to precipitate the resin and subsequent formation of the paper on a cylinder or Fourdrinier machine in the usual manner. They may also be used for the tanning and impregnation of leather, for the treatment of pigments, and as latent accelerators for other aminoplastics and adhesives.

The dimethylol urea diethers used as starting materials in preparing the compounds of my invention are defined by the formula

$$ROCH_2.NH.CO.NH.CH_2OR' \quad (2)$$

wherein R' is any suitable alcohol-forming radical but is preferably the radical of a lower aliphatic alcohol such as methyl, ethyl or propyl alcohol and R is the radical of an alcohol containing 4 or more carbon atoms, which forms a water-insoluble dimethylol urea ether. The most important starting materials are those in which R is the radical of an aliphatic alcohol such as butyl, amyl, n-octyl, n-decyl, n-dodecyl or n-tetradecyl, octadecyl or other higher alcohols obtainable by the reduction of coconut fatty acid mixtures or other higher aliphatic acids. Branched-chain higher aliphatic alcohols may also be used, such as isobutyl and isoamyl alcohols; 2-, 3-, and 4-methyl pentanol-1; 2-ethyl-hexanol-1; 5-ethyl-nonanol-2; and 3,9-diethyl tridecanol-6.

Mixtures of branched chain higher alcohols obtained as by-products in the commercial hydrogenation of oxides of carbon with promoted copper chromite catalysts and from the hydrogenation of higher aliphatic ketones with nickel catalysts may be employed. Mixtures of this type are available commercially from E. I. du Pont de Nemours & Co. under the name "Du Pont HTP Alcohols," typical mixtures being sold as "B–22," "B–23," "B–24" and "B–30" fractions. The "B–22" fraction contains about 60–65% of primary alcohols, principally 2-methyl pentanol-1; about 15–20% of secondary alcohols, principally di-isopropyl carbinol, and about 18–20% of ketones, principally 2,4-dimethyl hexanone-3. The other fractions contain primary and secondary alcohols of higher molecular weight, notably 2,4-dimethyl pentanol-1, 2,4-dimethyl hexanol-3, 4-methyl hexanol-1, 2,4-dimethyl hexanol-1 and 4-methyl heptanol-1.

In addition to the aliphatic alcohols exemplified by those enumerated above, alcohols of the cyclo-aliphatic, aromatic or heterocyclic series may also be used. Thus, for example, cyclohexanol and cycloaliphatic alcohols of 4–8 or more carbon atoms obtainable by the catalytic reduction of naphthenic acids may be employed, or such aromatic alcohols as benzyl alcohol and its homologs. The exact choice of alcohols will depend largely upon the use intended for the final quaternary nitrogen condensation product, and any suitable alcohol may be employed.

The dimethylol urea ethers of Formula (2) may be prepared by various methods. Diethers in which R and R' are the same may be prepared by heating one mole of dimethylol urea with two moles (or preferably a substantial excess over two moles) of an alcohol of 4 or more carbon atoms or a mixture thereof as outlined above in the presence of small amounts of an acid condensing agent such as phosphoric, oxalic or phthalic acid. When this method of preparation is used the reaction is preferably conducted for about 30 minutes or longer at temperatures of 60–100° F. after which the solution is neutralized and the chemical water of condensation is removed by distillation under reduced pressures.

The preferred starting materials for my new compounds, however, are mixed ethers, which are most advantageously prepared by a method of ester or ether interchange. I first prepare a diether of dimethylol urea using two moles of an alcohol having the alcohol-forming radical R' of Formula (2), such as methyl or ethyl alcohol, by reacting dimethylol urea with the alcohol in the presence of an acid condensing agent as described above. I then heat this diether under slightly acid conditions with the appropriate quantity of an alcohol containing 4 or more carbon atoms and having the desired alcohol-forming radical R in Formula (2) in order to bring about a replacement of the first alcohol-forming radical by the second. Thus, for example, dimethoxy-, or diethoxy dimethylurea may be heated with an equimolecular quantity of a higher aliphatic alcohol such as N-butanol, 2-ethyl hexanol-1, n-decanol, etc., in the presence of a small amount of phthalic acid whereby there is obtained a mixed ether in which one molecule of dimethylurea is combined symmetrically with one methyl or ethyl radical and with one butyl, octyl or decyl radical. These ethers are then reacted with salts of tertiary nitrogen bases to form the new quaternary compounds of my invention.

Although salts of any tertiary nitrogen base can be condensed with the dimethylurea diethers described above, the most important classes of compounds for this purpose are the salts of tertiary amines and the salts of pyridine and pyridine homologs. The salts of these two classes of compounds correspond respectively to the formula

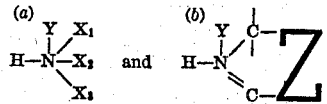

wherein $X_1$, $X_2$ and $X_3$ in Formula (a) are preferably alkyl radicals such as methyl or ethyl and Z in Formula (b) is the residue of a pyridine base. In either formula Y is the anion of the acid that forms a salt with the tertiary nitrogen base and is preferably a halogen such as chlorine, bromine or iodine, although any acid sufficiently strong to form a salt with a tertiary nitrogen base may be employed. These salts are defined as a class by the formula $$T-N(tert)-Y$$

wherein N(tert) is the tertiary nitrogen base used and Y is as defined above. Suitable tertiary amines are trimethylamine, triethylamine and the like, while any pyridine base may be employed such as pyridine, the alkyl substituted pyridines or picolines and pyridine bases containing condensed aromatic nuclei such as the quinolines.

The new quaternary nitrogen condensation products of my invention are prepared by reacting the dimethylol urea ethers of Formula (2) with the tertiary nitrogen base salts described above. Upon heating these two classes of compounds at temperatures of 30–80° C. and preferably on the order of 40–70° C. alcohol is liberated and the new condensation products are formed by the following reaction

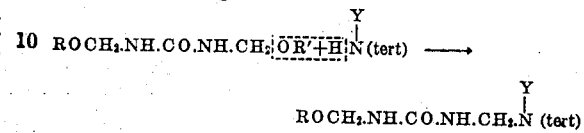

wherein R, Y and N(tert) are as defined above. The salts of pyridine bases are much more easily condensed with the dimethylol urea ethers by this method and form quaternary compounds which are much more readily soluble in water, and therefore the condensation products of these pyridinium salts constitute a preferred class of the compounds of the present invention. The corresponding quaternary ammonium compounds are much more difficult to prepare and are more difficultly soluble in water, but these products can be dispersed in water and are therefore included within the scope of the invention in its broader aspects. I have also found that the salts of tertiary nitrogen bases formed with inorganic acids will react much more readily with the dimethylol urea ethers described above than will the corresponding salts of organic acids, and therefore I prefer to employ strong inorganic acids such as hydrochloric, hydrobromic and nitric acids or even weaker inorganic acids such as sulfurous acid in preference to the organic acids such as acetic and chloracetic acids.

The invention will be illustrated in greater detail by the following specific examples. It should be understood, however, that these examples are given primarily for purposes of illustration and that the invention in its broader aspects is not limited thereto.

*Example 1*

Dimethoxy dimethylurea was prepared by dissolving 1 part by weight of freshly prepared dimethylol urea in 2 parts of methanol containing .0025 part of oxalic acid, adding sufficient NaOH solution to raise the pH to 8.0 or slightly higher and concentrating under reduced pressure to remove excess alcohol and the water of condensation. The product was crystallized and dried at 45° C. to constant weight.

148 parts by weight of dimethoxy dimethylurea were charged into a flask fitted with an agitator and distillation column together with 270 parts of n-octadecanol and 0.1 part of phthalic acid. The flask was heated to about 85° C. during 30–45 minutes to dissolve the contents after which the pressure was reduced to about 435 mm. of mercury and the distillation of methanol was begun. After about 30 minutes the pressure had risen to 700 mm. and the temperature to 100° C., and the distillation of methanol was completed under these conditions in about 15 minutes. 33 parts of methanol were removed in this manner. The product was the stearyl methyl ether of dimethylol urea of the formula.

$$C_{18}H_{37}OCH_2.NH.CO.NH.CH_2OCH_3$$

It was a white solid of waxy consistency, insoluble and immiscible with water but soluble in acetone.

The lauryl methyl ether of dimethylol urea was prepared by the same method, substituting 186 parts of lauryl alcohol for the stearyl alcohol used in the above procedure.

Example 2

Pyridine hydrochloride was prepared by dissolving pyridine in benzene, passing in dry gaseous HCl, and filtering off and drying the precipitated salt.

A mixture containing 38.6 parts by weight of the stearyl methyl ether of dimethylol urea of Example 1, 40 parts of 95% ethyl alcohol and 11.5 parts of pyridine hydrochloride were reacted at 70° C. for 30 minutes, giving a clear solution. The solution was dried at 40–50° C. to a water-soluble powder which was identified as the pyridinium salt of monostearyl ether of dimethylurea.

Upon heating a sample of the dried powder at 80–100° C. fumes of pyridine were given off and an amorphous, water-insoluble and water-repellent solid was obtained. An aqueous solution was even more easily and rapidly dissociated when heated above 80° C. and deposited a water-repellent film on the bottom of a shallow dish containing the solution. Upon baking the dish at 130° C. this film was further converted to an infusible, water-repellent resin.

10 parts by weight of the dried powder were dissolved in 30 parts of hot denatured ethyl alcohol and diluted with 100 parts of warm water. 80 x 80 cotton cloth and spun rayon challis were padded in the solution, passed between rollers set to retain a weight of solution equal to the weight of the cloth, and dried and cured by heating in an oven for 7 minutes at 290° F. Both samples of the treated cloth were then very soft and had excellent water-repellency.

Example 3

A mixture containing 80 parts by weight of stearyl methyl ether of dimethylol urea, 28 parts of pyridine hydrochloride, 40 parts of ethyl alcohol and 5 parts of pyridine was reacted at 70° C. for 30 minutes and then poured into 600 parts of acetone. The resulting precipitate was filtered off, washed with acetone and dried at 40° C. The dry powder was readily soluble in water.

An analysis of a sample for carbon, hydrogen, nitrogen, chlorine and formaldehyde gave the following molar ratios:

Pyridine : urea = 0.98 : 1
HCHO : urea = 2 : 1
Octadecanol : urea = 1 : 1
Chlorine : urea = 1 : 1

This corresponds to a compound of the formula

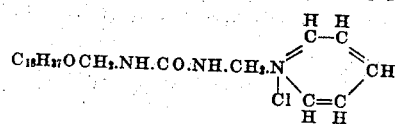

Example 4

30.2 parts by weight of the lauryl methyl ether of dimethylol urea were suspended in 40 parts of ethyl alcohol containing 10.5 parts of trimethylamine hydrochloride and heated at 60° C. for 15–17 hours, or until a clear solution was obtained. This solution was poured into 300 cc. of acetone and the resulting precipitate was filtered off, washed with acetone and dried at 40° C. The product was the quaternary ammonium salt of monolauryl ether of dimethylurea of the formula

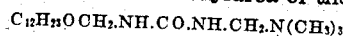

This product was obtained as a white powder which was dispersible in water to a 10% colloidal solution or suspension having a milky appearance.

A piece of cotton cloth was soaked in this dispersion, wrung out to 10% solids on the weight of the cloth, and dried and cured by heating at 280° F. for 3 minutes. The treated cotton was highly water-repellent.

Example 5

66 parts by weight of SO₂ were absorbed in 79 parts of pyridine to form pyridine sulfite. 386 parts of stearyl methyl ether of dimethylol urea were then added and the mixture was heated at 60° C. for about 20–30 minutes until solution occurred. The product was then poured into ethyl ether and the precipitated pyridinium salt of monostearyl ether of dimethylurea was recovered by filtration, washing and drying. The dried material was easily soluble in water to a soap-like solution that foamed on shaking.

50 parts by volume of a 10% aqueous solution of trimethoxy trimethylmelamine, prepared by condensing trimethylol melamine with methanol by the method described in the first paragraph of Example 1, were mixed with an equal quantity of a 10% solution of the above described pyridinium salt and 0.5 part of a diammonium phosphate curing accelerator were added. Cotton cloth and spun rayon challis were impregnated with the resulting solution, squeezed out to retain 10% solids on the dry weight of the cloth, and dried and cured by heating in an oven for 8 minutes at 280° F. The treated cloth was found to possess excellent water repellence.

Example 6

400 parts by weight of dimethylol urea, 920 parts of n-butanol and 1.4 parts of phthalic acid were heated together at 80° C. until solution was complete and then distilled at atmospheric pressure until the temperature of the liquid reached 115° C. 350 parts of 2-ethyl-hexanol-1 were then added and the mixture was distilled under reduced pressure at 90° C. to replace one butyl radical by an octyl radical. The product was the symmetrical butyl octyl diether of dimethylol urea of the formula

C₈H₁₇OCH₂.NH.CO.NH.CH₂O.C₄H₉

29 parts by weight of this compound were dissolved in an equal weight of alcohol and mixed with 11.5 parts of pyridine hydrochloride. The mixture was heated at 70° C. for 5–10 minutes and the resulting solution was poured into acetone. A white precipitate was obtained which was washed with acetone and dried to a white powder which was easily soluble in water.

What I claim is:

1. Quaternary salts of dimethylurea monoethers of the formula

wherein R is an alcohol-forming radical containing at least 4 carbon atoms, N(tert) is the molecule of a tertiary nitrogen base, and Y is an anion.

2. Quaternary salts of dimethylurea monoethers of the formula

wherein R is an alcohol-forming radical containing at least 4 carbon atoms, N(tert) is the molecule of a tertiary nitrogen base, and Y is an inorganic anion.

3. Quaternary salts of dimethylurea monoethers of the formula

wherein R is an alcohol-forming radical containing at least 4 carbon atoms, N(tert) is the molecule of a tertiary nitrogen base, and Y is a halogen radical.

4. Quaternary salts of dimethylurea monoethers of the formula

ROCH₂.NH.CO.NH.CH₂.N(tert).Y wherein R is an alkyl radical containing at least 4 carbon atoms, N(tert) is the molecule of a tertiary nitrogen base, and Y is an anion.

5. Quaternary salts of dimethylurea monoethers of the formula

ROCH₂.NH.CO.NH.CH₂.N(tert).Y wherein R is an alkyl radical, N(tert) is the molecule of a tertiary nitrogen base, and Y is an inorganic anion.

6. Quaternary salts of dimethylurea monoethers of the formula

ROCH₂.NH.CO.NH.CH₂.N(tert).Y wherein R is an alkyl radical containing at least 4 carbon atoms, N(tert) is the molecule of a tertiary nitrogen base, and Y is a halogen radical.

7. Quarternary ammonium salts of dimethylurea monoethers of the formula

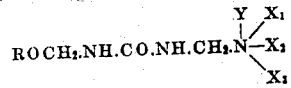

wherein R is an alcohol-forming radical containing at least 4 carbon atoms, X₁, X₂ and X₃ are lower alkyl radicals and Y is an inorganic anion.

8. Quaternary ammonium salts of dimethylurea monoethers of the formula

wherein R is an alcohol-forming radical containing at least 4 carbon atoms, X₁, X₂ and X₃ are lower alkyl radicals and Y is a halogen radical.

9. Quaternary pyridinium salts of dimethylurea monoethers of the formula

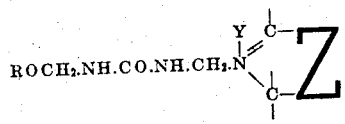

wherein R is an alcohol-forming radical containing at least 4 carbon atoms, Z represents the atoms necessary to complete the pyridine ring and Y is an inorganic anion.

10. Quaternary pyridinium salts of dimethylurea monoethers of the formula

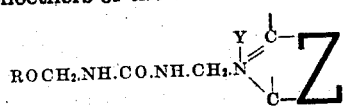

wherein R is an alcohol-forming radical containing at least 4 carbon atoms, Z represents the atoms necessary to complete the pyridine ring and Y is a halogen radical.

11. Quaternary pyridinium salts of dimethylurea monoethers of the formula

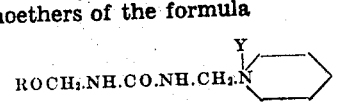

wherein R is an alcohol-forming radical containing at least 4 carbon atoms and Y is an inorganic anion.

12. Quaternary pyridinium salts of dimethylurea monoethers of the formula

wherein R is an alcohol-forming radical containing at least 4 carbon atoms and Y is a halogen radical.

13. A pyridinium salt of monostearyl ether of dimethylurea.

14. A method of preparing a quaternary salt of a dimethylurea monoether which comprises heating a diether of dimethylol urea with a salt of a tertiary nitrogen base at temperatures of 30–80° C.

15. A method of preparing a quaternary salt of a dimethylurea monoether which comprises heating a diether of dimethylol urea with an inorganic acid salt of a tertiary nitrogen base at temperatures of 30–80° C.

16. A method of preparing a quaternary salt of a dimethylurea monoether which comprises heating at temperatures of 30–80° C. a reaction mixture containing a diether of dimethylol urea and a salt of a tertiary nitrogen base having the formula H—N(tert)
|
Cl wherein N(tert) is the molecule of a tertiary nitrogen base.

17. A method of preparing a quaternary salt of a dimethylurea monoether of the formula ROCH₂.NH.CO.NH.CH₂.N(tert).Y wherein R is an alcohol-forming radical containing at least 4 carbon atoms, N(tert) is the molecule of a tertiary nitrogen base and Y is an inorganic anion which comprises heating at temperatures of 30–80° C. a reaction mixture containing a diether of dimethylol urea of the formula

ROCH₂.NH.CO.NH.CH₂OR' wherein R is as defined above and R' is a lower alkyl radical together with an inorganic acid salt of a tertiary nitrogen base having the formula H–N(tert).Y wherein N(tert) and Y are as defined above.

18. A method of preparing a quaternary salt of a dimethylurea monoether of the formula

wherein R is an alcohol-forming radical containing at least 4 carbon atoms, X₁, X₂ and X₃ are lower alkyl radicals and Y is an inorganic anion which comprises heating at temperatures of 30–80° C. a reaction mixture containing a diether of dimethylol urea of the formula

ROCH₂.NH.CO.NH.CH₂OR' wherein R is as defined above and R' is a lower alkyl radical together with an inorganic acid salt of a tertiary ammonium base having the formula

wherein X₁, X₂, X₃ and Y are as defined above.

19. A method of preparing a quaternary salt of a dimethylurea monoether of the formula

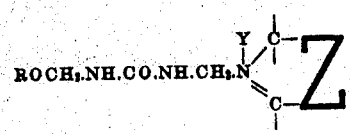

wherein R is an alcohol-forming radical containing at least 4 carbon atoms, Z represents the atoms necessary to complete the pyridine ring and Y is an inorganic anion which comprises heating at temperatures of 30–80° C. a reaction mixture containing a diether of dimethylol urea of the formula

ROCH₂.NH.CO.NH.CH₂OR′ wherein R is as defined above and R′ is a lower alkyl radical together with an inorganic acid salt of a pyridine base having the formula

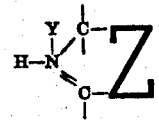

wherein Y and Z are as defined above.

HERBERT J. WEST.